(12) United States Patent
Panuccio et al.

(10) Patent No.: US 9,680,350 B2
(45) Date of Patent: Jun. 13, 2017

(54) AIR SEPARATION POWER GENERATION INTEGRATION

(75) Inventors: Gregory Joseph Panuccio, Amherst, NY (US); Raymond Francis Drnevich, Clarence Center, NY (US); Minish Mahendra Shah, East Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 501 days.

(21) Appl. No.: 14/119,087

(22) PCT Filed: May 23, 2012

(86) PCT No.: PCT/US2012/039186
§ 371 (c)(1),
(2), (4) Date: Nov. 20, 2013

(87) PCT Pub. No.: WO2012/162417
PCT Pub. Date: Nov. 29, 2012

(65) Prior Publication Data
US 2014/0091577 A1     Apr. 3, 2014

Related U.S. Application Data

(60) Provisional application No. 61/490,346, filed on May 26, 2011.

(51) Int. Cl.
*F02C 1/00* (2006.01)
*H02K 7/18* (2006.01)
(Continued)

(52) U.S. Cl.
CPC ............. *H02K 7/1823* (2013.01); *F02C 6/06* (2013.01); *F02C 6/18* (2013.01); *F25J 3/046* (2013.01);
(Continued)

(58) Field of Classification Search
CPC ...... F02C 3/20; F02C 3/30; F02C 7/08; F02C 7/10
See application file for complete search history.

(56) References Cited

U.S. PATENT DOCUMENTS

| 3,795,816 A | 3/1974 | Frei |
| 4,224,045 A | 9/1980 | Olszewski et al. |

(Continued)

FOREIGN PATENT DOCUMENTS

EP    1058075 A1    12/2000

OTHER PUBLICATIONS

Smith A R et al: "Next-Generation Integration Concepts for Air Separation Units and Gas Turbines", Journal of Engineering for Gas Turbines and Power, ASME, New York, NY, US, vol. 119, No. 2, Apr. 1, 1997 (Apr. 4, 1997), pp. 298-304, XP001032885, ISSN: 0742-4795.

*Primary Examiner* — Gerald L Sung
(74) *Attorney, Agent, or Firm* — Iurie A. Schwartz

(57) ABSTRACT

The present invention provides a method and apparatus for separating air and generating electrical power. A compressed air stream produced in a main air compressor is introduced into an air separation unit that cryogenically rectifies the air into component products. During turndown conditions of the air separation unit, a combustion air stream formed from all or part of the compressed air stream is introduced into a combustor in which a fuel is combusted to produce a heated and pressurized combustion stream. Such stream is introduced to a turbine connected to an electrical generator to generate electrical power. The combustion air stream can be saturated with moisture to increase power output. Further, the combustion air stream can also be preheated with an exhaust of a gas turbine.

10 Claims, 5 Drawing Sheets

(51) Int. Cl.
*F25J 3/04* (2006.01)
*F02C 6/06* (2006.01)
*F02C 6/18* (2006.01)
*F02C 3/30* (2006.01)
*F02C 3/20* (2006.01)

(52) U.S. Cl.
CPC ....... *F25J 3/04836* (2013.01); *F25J 3/04842* (2013.01); *F02C 3/20* (2013.01); *F02C 3/30* (2013.01); *F25J 2240/70* (2013.01); *F25J 2240/82* (2013.01)

(56) References Cited

U.S. PATENT DOCUMENTS

| | | | | |
|---|---|---|---|---|
| 4,382,366 A | | 5/1983 | Gaumer | |
| 4,545,787 A | | 10/1985 | Hegarty | |
| 5,386,686 A | * | 2/1995 | Chretien | F02C 3/20 60/783 |
| 5,406,786 A | * | 4/1995 | Scharpf | C01B 13/02 60/39.12 |
| 5,740,673 A | * | 4/1998 | Smith | F01K 23/068 60/39.12 |
| 5,802,875 A | * | 9/1998 | Drnevich | F02C 3/30 62/656 |
| 5,901,547 A | * | 5/1999 | Smith | F02C 3/28 60/39.12 |
| 6,345,493 B1 | | 2/2002 | Smith et al. | |
| 6,718,794 B2 | | 4/2004 | Brugerolle et al. | |
| 2003/0131582 A1 | * | 7/2003 | Anderson | F01K 23/068 60/39.55 |
| 2009/0113895 A1 | * | 5/2009 | Steele | F01D 1/026 60/780 |
| 2010/0115960 A1 | * | 5/2010 | Brautsch | F02C 3/30 60/772 |
| 2014/0007553 A1 | * | 1/2014 | Rajan | F02C 7/22 60/39.19 |

* cited by examiner

AIR SEPARATION POWER GENERATION INTEGRATION

This application is a national US application of prior International Application PCT/US2012/039186, filed May 23, 2012, which claims priority from U.S. Provisional Application 61/490,346, filed May 26, 2011, which is incorporated by reference herein in its entirety.

FIELD OF THE INVENTION

The present invention relates to an air separation and power generation method and apparatus in which during design operational conditions a compressed air stream is introduced into an air separation unit and separated through cryogenic rectification to produce one or more products and during turn-down operational conditions, a combustion air steam, formed from part of the compressed air stream, is introduced into a combustor to support combustion of a fuel and generate a heated and pressurized combustion stream that is expanded in a turbine to generate electrical power.

BACKGROUND OF THE INVENTION

In the course of the operational life of an air separation unit, there are times when the full capacity of the plant is not utilized to make products. For example, it can be economical to shed power load to an air separation unit ("ASU") by turning down the plant production rate during periods when electrical power is at peak value (e.g. weekday afternoons during the summer). The total flow of product from the ASU to the customer is maintained by vaporizing stored liquid product and mixing it with the product from the ASU. The liquid used during load shedding is regenerated by increasing the liquid production rates during periods when electrical power has relatively low value (e.g. weekday evenings and weekends). Load shedding is economical because the value of incremental power sold (or saved) during the peak period more than offsets the costs associated with the additional power required during the evening and the extra capital required for the capacity to remake the liquid.

In addition to load shedding, there are several other scenarios where excess ASU capacity may exist that is being underutilized. For example, there could be a facility that supplies customers that have variable demand for products and the ASU production rate would be ramped up or down in response to that demand. Or, there could be an enclave of several individual plants where an entire ASU or multiple ASUs could be turned on or off to meet customer demand.

As will be discussed, the present invention provides a method and apparatus in which, unlike the prior art, the main air compressor is not turned down during periods in which the ASU is being turned down to allow excess compressed air from the main air compressor to be used to support combustion of a fuel and thereby produce heated combustion products that are expanded in a turbine connected to a generator to generate electrical power. The electrical power can be supplied to the grid or used to power the main air compressor to either realize an economic gain from the supply of such power to the grid or to reduce the electrical power costs involved in powering the main air compressor.

SUMMARY OF THE INVENTION

In one aspect, the present invention provides a method of separating air and generating electrical power in which the air is compressed in a main air compressor to produce a compressed air stream. A combustion air stream is formed from at least part of the compressed air stream either before or after the compressed air stream is pre-purified. During design operational conditions, the compressed air stream is introduced into an air separation unit and the air is separated through cryogenic rectification to produce one or more products. During turn-down operational conditions where the one or more products are not being produced or being produced at a lesser rate, the combustion air stream and a fuel stream are introduced into a combustor. The fuel is combusted in the combustor with the aid of the combustion air stream to produce a heated and pressurized combustion stream which is expanded in a turbine connected to an electrical generator to generate electrical power. The main air compressor is operated such that the compressor produces the compressed air stream such that excess compressed air is thereby available to produce the at least part of the compressed air stream during the turn-down operational conditions and to generate the electrical power.

The turbine produces an exhaust stream and the exhaust stream can indirectly transfer heat to the combustion air stream prior to the introducing the combustion air stream into the combustor. Further, the combustor can be a combustor of a gas turbine and the expander can be an expander of the gas turbine. The combustion air stream is further compressed and introduced into the combustor.

The combustion air stream can be saturated with moisture prior to the exhaust stream indirectly transferring heat to the combustion air stream. In a specific embodiment, a steam stream is condensed in a condenser to produce a condensed stream. The condensed stream is pumped in a pump to produce a first pressurized water stream which is combined with a second pressurized water stream to produce a combined water stream. The combined water stream is heated in the condenser through indirect heat exchange with the steam stream to produce a heated water stream. The heated water stream is counter-currently contacting with the combustion air stream in a saturator to produce the combustion air stream saturated with the moisture and a bottoms liquid. At least part of the bottoms liquid is recirculated to form the second pressurized water stream.

In another specific embodiment to saturate the combustion air stream with moisture, a water stream is pumped in a pump to produce a pressurized water stream. The pressurized water stream is heated with the exhaust stream in a water heater positioned between the turbine and a recuperator used in the indirect heat transfer from the exhaust stream to the combustion air stream to at least in part produce a heated water stream. The heated water stream is counter-currently contacted with the combustion air stream in a saturator to produce the combustion air stream saturated with the moisture and a bottoms liquid. The water stream is formed by combining the bottoms liquid with a make-up water stream.

In yet a further saturation method, a water stream, composed of bottoms liquid of a saturator, is pumped in a pump to produce a pressurized water stream. The pressurized water stream is heated with the exhaust stream in a water heater positioned between the turbine and a recuperator used in the indirect heat transfer from the exhaust stream to the combustion air stream. A boiler feed water stream is pumped and combined with the pressurized water stream after having been heated in the water heater to form a heated water stream. The heated water stream counter-currently contacted with the combustion air stream in the saturator to produce the combustion air stream. saturated with the moisture and the bottoms liquid.

A still further embodiment for saturating the combustion air stream involves pumping a water stream in a pump to produce a pressurized water stream. The pressurized water stream is heated with the exhaust stream in a water heater to produce a heated water stream. The combustion air stream is formed by further compressing the at least part of the compressed air stream in a booster compressor either before or after the compressed air stream has been pre-purified in the pre-purification unit. The heated water stream is counter-currently contacted with the combustion air stream in a saturator to produce the combustion air stream saturated with the moisture and a bottoms liquid. The water stream is formed, at least in part, from the bottoms liquid. The combustion air stream, after having been saturated by moisture, is heated through indirect heat exchange with a gas turbine exhaust used to generate additional electrical power.

In another aspect, the present invention provides an apparatus for separating air and generating electrical power. In accordance with such aspect, a main air compressor is provided to compress air and thereby to produce a compressed air stream. A means is provided for producing a combustion air stream from at least part of the compressed air stream either before or after the compressed air stream is pre-purified in a pre-purification unit. An air separation unit is provided in flow communication with the main air compressor. The air separation unit is configured to selectively operate in a design operational condition and a turn-down operational condition such that during the design operational condition the air within the compressed air stream is separated through cryogenic rectification to produce one or more products and during the turn-down operational condition one or more products are not being produced or being produced at a lesser rate than during design operational conditions. A combustor is in flow communication with the main air compressor such that during the turn-down operational condition, a fuel stream is combusted in the combustor through combustion supported by the combustion air stream and a heated and pressurized combustion stream is produced from the combustion. A turbine is in flow communication with the combustor to expand the heated and pressurized combustion stream to produce an exhaust stream and an electrical generator connected to the turbine to generate the electrical power. The main air compressor has sufficient capacity to allow the combustion air stream to be available during the turn-down operational condition to support combustion of the fuel stream for generation of the electrical power.

The recuperator can be positioned between the turbine and the main air compressor such that an exhaust stream produced by turbine indirectly transfers heat to the combustion air stream prior to introduction of the combustion air stream into the combustor.

A means for adding moisture to the combustion air stream involving a heat exchanger that can be positioned between the recuperator and the main air compressor such that the combustion air stream contains moisture prior to the exhaust stream indirectly transferring heat to the combustion air stream. In a specific embodiment, the means for adding moisture comprises a condenser for condensing a steam stream in a condenser to produce a condensed stream. A pump is connected to the condenser to pump the condensed stream and thereby to produce a first pressurized water stream. A saturator is configured to counter-currently contacting a heated water stream with the combustion air stream to produce the combustion air stream with moisture and a bottoms liquid. A recirculation flow path connects the pump, the condenser and the saturator and is configured: to combine the first pressurized water stream with a second pressurized water stream to produce a combined water stream; to heat the combined water stream in the condenser through indirect heat exchange with the steam stream to produce the heated water stream; and has a recirculation pump positioned to recirculate at least part of the bottoms liquid to form the second pressurized water stream.

In an alternative embodiment, the means for adding moisture can comprise a pump to pressurize a water stream and thereby to produce a pressurized water stream. A water heater is connected to the pump and positioned between the turbine and the recuperator to indirectly heat the pressurized water stream with the exhaust stream to at least in part produce a heated water stream. A saturator is provided in flow communication with the water heater and is configured to counter-currently contact the heated water stream with the combustion air stream to produce the combustion air stream with moisture and a bottoms liquid. The pump is in flow communication with the saturator and a make-up water inlet for introduction of a make-up water stream such that the water stream is formed from the bottoms liquid and the make-up water stream.

In yet a further embodiment, the means for adding moisture comprises a pump to pressurize a water stream formed from bottoms liquid of a saturator and thereby to produce a pressurized water stream. A water heater is connected to the pump and positioned between the turbine and the recuperator to indirectly heat the pressurized water stream with the exhaust stream to at least in part produce a heated water stream. A feed water pump is positioned between the water heater and the saturator such that a heated water stream is formed by pumping a boiler feed water stream and the boiler feed water stream after having been pumped is combined with the pressurized water stream after having been heated in the water heater. The saturator is in flow communication with the water heater and configured to counter-currently contact the heated water stream with the combustion air stream to produce the combustion air stream with moisture and the bottoms liquid.

In yet a further embodiment of the present invention, a pump pumps a water stream to produce a pressurized water stream. A water heater is positioned between the pump and the turbine to heat the pressurized water stream with an exhaust stream produced by the turbine, thereby to produce a heated water stream. The combustion air stream producing means comprises a booster compressor in flow communication with the main air compressor, either before or after the pre-purification unit, such that the at least part of the compressed air stream is further compressed to produce the combustion air stream. A saturator is connected between the water heater and the booster compressor and is configured to counter-currently contact the heated water stream with the combustion air stream, thereby to produce the combustion air stream with moisture and a bottoms liquid. The pump is in flow communication with the saturator such that the water stream is formed, at least in part, from the bottoms liquid. An air preheater is positioned between the saturator and the combustor such that the combustion air stream after having moisture added is preheated in the air preheater before being introduced into the combustor. A gas turbine is connected to another generator to generate additional electrical power and producing a gas turbine exhaust and the gas turbine is connected to the air preheater such that the combustion air stream is preheated in the air preheater through indirect heat exchange with the gas turbine exhaust.

In a still further embodiment of the present invention, the combustor can be a combustor of a gas turbine and the expander is therefore, an expander of the gas turbine. The combustion air stream producing means comprises a booster compressor in flow communication with the main air compressor, either before or after the pre-purification unit, such that the at least part of the compressed air stream is further compressed to produce the combustion air stream.

As used herein and in the claims, the term "air separation unit" means an apparatus having a main heat exchanger to cool the air to a temperature suitable for its distillation and one or more distillation columns and associated equipment and heat exchangers to separate the air into the one or more products. A pre-purification unit can be included in the air separation unit to purify the air of higher boiling impurities. Such pre-purification unit can also be used in connection with a compressor feeding air to more than one air separation units in an enclave and as such, might not be associated with a particular air separation unit. In this regard, it is understood that the present invention and the appended claims are meant to cover applications of the present invention where one main air compressor feeds several plants in an enclave or the main air compressor is part of an air separation plant along with a pre-purification unit.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

In the various figures, where common element are used the same reference numbers are retained to avoid repetition of explanation.

DETAILED DESCRIPTION

Figure 1:
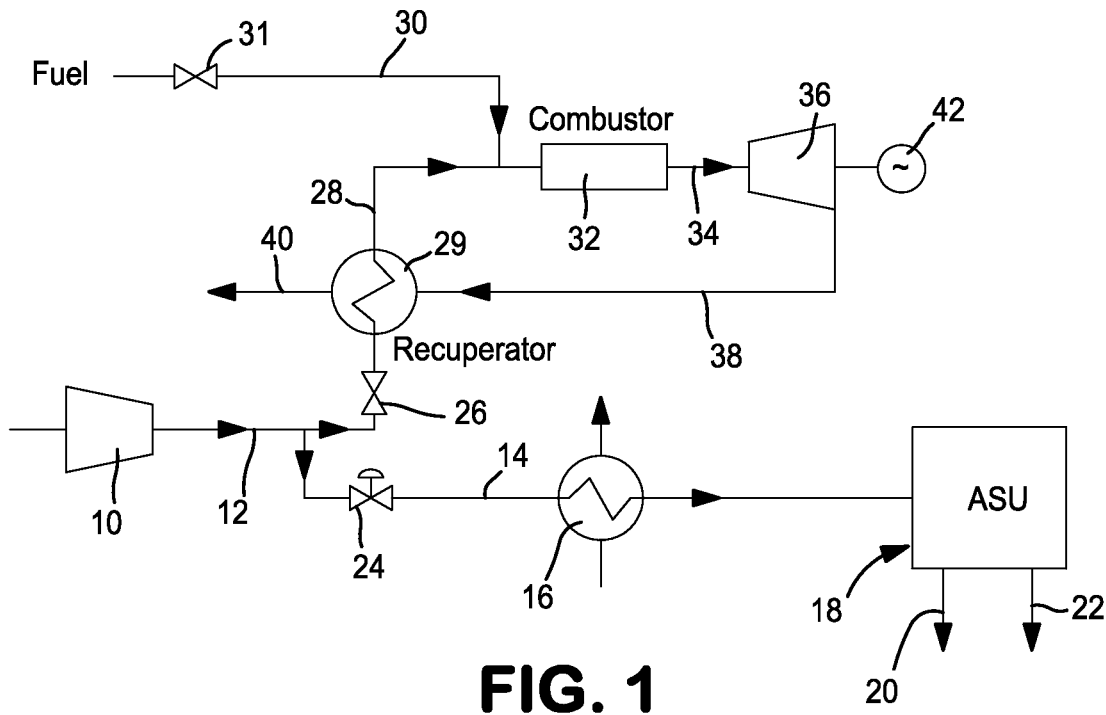
FIG. 1 is a schematic illustration of an apparatus for conducting a method in accordance with the present invention.

With reference to FIG. 1, an integrated air separation and power generation apparatus 1 is illustrated. In apparatus 1, a main air compressor 10 produces a compressed air stream 12. Main air compressor 10 can be a multi-stage, intercooled integral gear compressor and may also, incorporate condensate removal between stages. During design operational conditions, the compressed air stream 12 is passed, as an air separation stream 14, through an after cooler 16 to remove the heat of compression. Thereafter, the air separation stream 14 is passed into an air separation unit 18 in which the air is separated by cryogenic rectification into oxygen and nitrogen products 20 and 22. Other products such as argon could also be produced.

Although not illustrated, but as would be known to those skilled in the art, air separation unit 18 includes a pre-purification unit that is designed to remove higher boiling impurities from the air such as water vapor, carbon dioxide and hydrocarbons and can incorporate adsorbent beds operating in an out of phase cycle that is a temperature swing adsorption cycle or a pressure swing adsorption cycle or combinations thereof. It is to be noted, that although not illustrated, the combustion air stream 28 could be formed after such a pre-purification unit. At least part of the compressed and purified air is then cooled to temperature suitable for the cryogenic rectification thereof within a main heat exchanger and then separated in one or more distillation columns to produce oxygen and nitrogen product streams 20 and 22. For example, the distillation columns can be higher and lower pressure columns connected to one another in a heat transfer relationship to produce nitrogen-rich vapor column overheads in such higher and lower pressure columns. A crude liquid oxygen, also known as kettle liquid, is produced as a column bottoms of the higher pressure column and such liquid is further refined in the lower pressure column to produce an oxygen-rich liquid column bottoms. The oxygen product stream 20 is formed from such oxygen-rich liquid column bottoms after a stream of which is heated in the main heat exchanger. Such oxygen product stream can be pressurized by pumping and as such can be a supercritical fluid. The nitrogen product stream 22 is formed from a nitrogen-rich vapor stream taken from the lower pressure column that has also been warmed in the main heat exchanger. Refrigeration can be added to the air separation unit by further compressing part of the compressed air and then turboexpanding the same prior to being introduced into the higher pressure column. A further part of the compressed air after having been further compressed can be liquefied in the main heat exchanger where the oxygen product stream 20 is desired as a supercritical fluid. The foregoing is exemplary only and as would be known to those skilled in the art, there are other distillation column systems that are used in air separation where low purity oxygen is required. Where an argon produce is required, an argon column could be connected to the lower pressure column for such purpose.

During turn down operation conditions, where, for example, the requirement for the oxygen product stream 20 is reduced, a control valve 24 is adjusted to decrease the flow of the air separation stream 14 and a valve 26 is opened to produce a combustion air stream 28 from part of the compressed air stream 12. The combustion air stream 28 then passes through a recuperator 29 and is thereby heated against a hot exhaust gas stream 38 to recover energy. After heating, the combustion air stream 28 is combusted with fuel, introduced as a fuel stream 30, into a combustor 32 where the fuel is combusted to produce a heated and pressurized combustion stream 34. A control valve 31 is set into an open position for purposes of admitting the fuel stream 30. An expander 36 is connected to the combustor 32 so that the heated and pressurized combustion stream 34 is expanded thereby to produce the hot exhaust gas stream 38. The expander 36 is connected to the recuperator 29 such that the combustion air stream is heated through indirect heat exchange with the hot exhaust gas stream 38 which is in turn discharged as an exhaust stream 40. The work of expansion produced by expander 36 is expended in an electrical generator 42, thereby to generate electrical power.

As has been described above, it can be economical to shed power load to the air separation unit 18 by turning down the plant production rate during periods when electrical power is at peak value. During such turn down operational condition for the air separation unit 18, the total flow of product from the air separation unit to the customer is maintained by vaporizing stored liquid product and mixing it with the product from the air separation unit 18, for instance liquid oxygen product 20. The liquid used during load shedding is regenerated by increasing the liquid production rates during periods when electrical power has relatively low value (e.g. weekday evenings and weekends). Load shedding is economical because the value of incremental power sold (or saved) during the peak period more than offsets the costs associated with the additional power required during the evening and the extra capital required for the capacity to remake the liquid.

During the load shedding period, in the prior art, the main air compressor 10 discharge air flow rate is reduced because of the reduced production rate from the air separation unit 18. In accordance with the present invention, however, the discharge air flow rate from the main air compressor 10 is not reduced; and in fact can be increased to its maximum rate or can remain at its maximum rate during load shedding periods. The incremental air flow available from the discharge of the main air compressor 10 as the combustion air stream 28 which is not used within the air separation plant 18 is, as described above, diverted to combustor 32, expander 36 to generate power from generator 42. Although not shown, stream 28 could be split so that the first part of stream 28 enters combustor 32 and the second part bypasses the combustor and mixes with stream 34 prior to expansion in unit 36. In such case, the air separation unit 18 generates products, for example, oxygen and nitrogen 20 and 22 at a reduced rate. However, the present invention also contemplates an operation in which the air separation unit 18 is turned off during such turn-down operational condition and no products are produced. In such case, all of the compressed air stream 12 from the main air compressor 10 is made available for expansion in the turbine 36 for power generation purposes.

Another possibility is to use the present invention in connection with main air compressors that have underutilized capacity in order to produce supplemental power. Potential applications may be in gasification facilities with variable oxygen demand, large air separation facilities with multiple cold boxes that have excess or unused compressor capacity, or large air separation facilities whose production rates are cycled up and down in response to grid electricity prices. In any of these cases, there is excess air available from the discharge of the main air compressor, for instance, main air compressor 10, that is not needed to produce one or more products from the air separation unit 18 which could instead be used to generate power as described herein. However, in all cases of an application of the present invention, the main air compressor has sufficient capacity to allow excess air to be available during the turn-down operational condition to support combustion of the fuel stream for generation of the electrical power.

Figure 2:
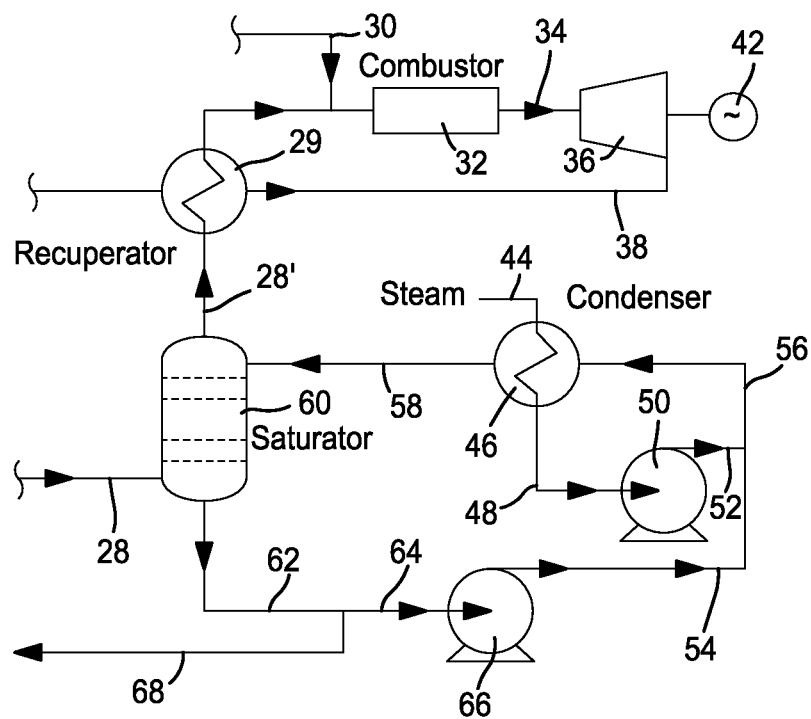
FIG. 2 is a fragmentary view of an alternative embodiment of FIG. 1.

The gross power generated in the expander 36 can be increased by adding moisture to the combustion air stream 28 before feeding such air to the combustor 32. The moisture in the air adds mass to the gas that flows through the expander which increases power output. An apparatus for adding such moisture is shown in FIG. 2 which illustrates a modification to FIG. 1, downstream of valve 26. In such modification, a steam stream 44 is condensed in condenser 46 to produce a condensed stream 48. Condensed stream 48 is pumped by a pump 50 to produce a first pressurized water stream 52. The first pressurized water stream 52 is combined with a second pressurized water stream 54 to produce a combined water stream 56. The combined water stream is heated in the condenser 46 through indirect heat exchange with the steam stream 44 to produce a heated water stream 58. The heated water stream 58 is counter-currently contact with the combustion air stream 28, formed in the same manner as in FIG. 1, within a saturator 60 to produce an elevated moisture level containing combustion air stream 28' that is saturated with moisture and a bottoms liquid. As well known in the art, the saturator 60 is a column containing a packing to produce the counter-current contact of the combustion air stream 28 with the heated water stream 58. In any case, the bottom liquid is removed from the saturator 60 as a bottoms water stream 62. A part of the bottoms water stream 64 is pumped by a pump 66 to produce the second pressurized water stream 54. Another part of the bottoms water stream 68 can be discharged as a blowdown stream 68. This discharge can be continuous or intermittent to prevent buildup of impurities within the illustrated apparatus.

The elevated moisture containing combustion air stream 28' is then passed through recuperator 29 and then used in the combustion of the fuel stream 30 within combustor 32 to generate power within expander 36. Electrical power is extracted from generator 42. As in FIG. 1, the hot exhaust stream 38 is passed through recuperator 29 to heat the elevated moisture containing combustion air stream 28' prior to combustion and is thereafter, discharged as exhaust stream 40.

It is most economical to use low pressure saturated steam in forming the steam stream 44 which acts as both a heating and moisture source. For example, saturated 90 psig steam (331° F.) can heat the saturator water to 300° F. with a 30° F. design pinch in the condensing exchanger 46. It is to be noted that the most direct way of adding moisture to combustion air stream 28 involves adding steam to the air or a natural gas stream serving as the fuel stream 30 at a pressure at or above the pressure of the given stream to which the moisture is to be added. However, the use of low level steam (steam at pressures below that of the combustion air stream 28 or the fuel stream 30) has the advantage that the value of the low pressure steam is less than that of high pressure steam, i.e. less power can be made in a steam turbine per pound of low pressure steam than per pound of high pressure steam.

Figure 3:
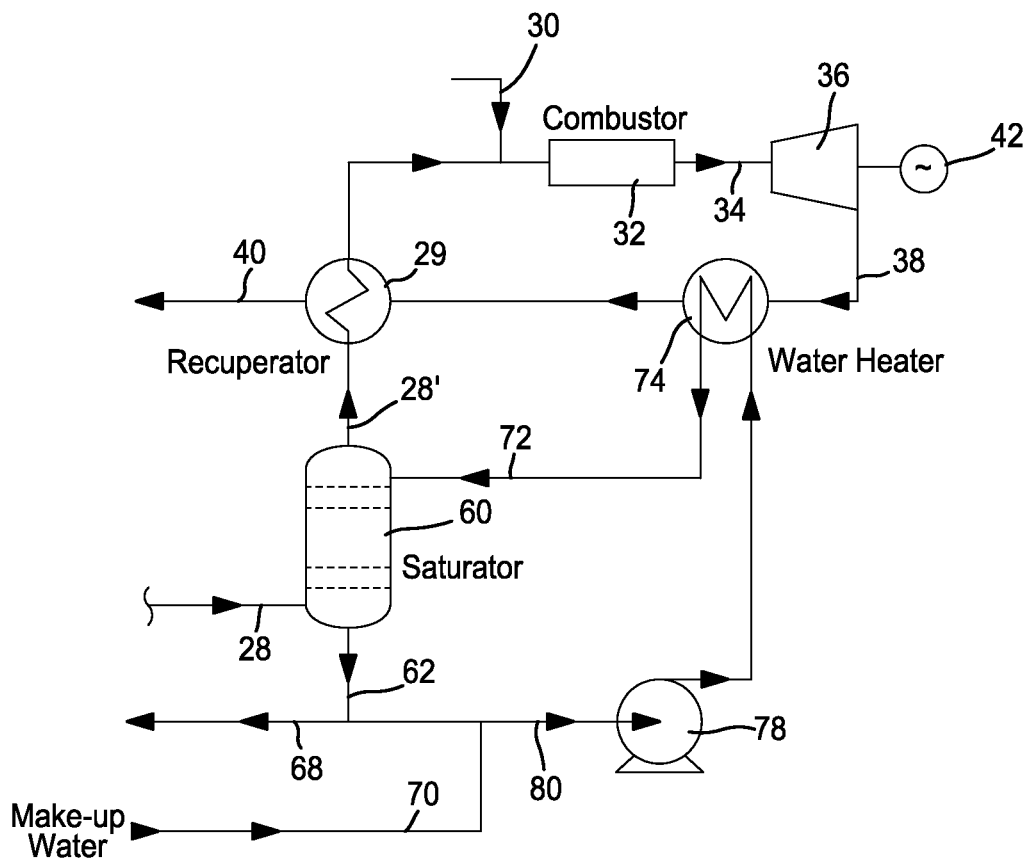
FIG. 3 is a fragmentary view of an alternative embodiment of FIG. 1.

FIG. 3 illustrates an alternative manner of adding moisture to the combustion air stream 28 and illustrates a modification to FIG. 1, downstream of valve 26. In FIG. 3, a make-up water stream 70 is the source of moisture for the combustion air stream 28 and the hot exhaust gas stream 38 is the source of energy for heating the water that is fed to the saturator 60. As in FIG. 2, the combustion air stream 28 is fed to saturator 60 where it contacts a heated and pressurized water stream 72. The moisture-laden or moisture containing combustion air stream 28' is combusted with fuel provided by fuel stream 30 in combustor 32 to generate the heated and pressurized combustion stream 34 that is then sent through a turbine expander 36 to generate power. The energy in the hot exhaust stream 38 is recovered in a water heater 74. Water heater 74 is connected to a pump 78 and positioned between the turbine 36 and the recuperator 29 to indirectly transfers heat to a water stream 80 pressurized by the pump 78 to form the heated and pressurized water stream 72 that is fed to the saturator 60. As illustrated, depending on the design, there may be additional heat left in the hot exhaust stream 38, after having heated water within water heater 74 that can be transferred to the moisturized combustion air stream 28' in the recuperator 29 before it is combusted and expanded.

A small portion of the cooled condensate formed of bottoms liquid leaving the bottom of the saturator can be sent to blowdown as the blow down stream 68 continuously or on an intermittent basis to prevent buildup of impurities. The remaining part of the bottoms water stream 62 is combined with makeup water stream 70 to form water stream 80, previously discussed. The water stream 80 is pressurized by pump 78 and thereby pressurized. After heating in water heater 74, the resulting heated and pressurized water stream 72 is fed to the top of saturator 60.

The following example compares the relative profitability of the three processing options described above. Parameters used to calculate the profitability of the three embodiments of the current invention are listed in Table. The air separation unit 18 for this example is designed for 3000 tpd of oxygen. The cold box is turned down to 70% capacity during load shedding but the main air compressor 10 remains running at 100 percent capacity. The excess compressed air not used in the air separation unit 18 forms the combustion air stream 28 that has a flow rate of approximately 337 klb/hr and consumes 11.7 MW of additional power to compress the excess air. The pressure and temperature of the air discharged from the main air compressor 10 are 151 psig and 250° F., respectively. The fuel flow rate of fuel stream 30 is set such that the exit temperature of the combustor 32 is 1500° F. and the moisture content in the air is varied between less than 0.5 mol percent and 30%. The value of fuel, natural gas, and make-up water are also listed in the Table below. In connection with an evaluation of the embodiment shown in FIG. 2, the value of the steam is included by calculating the power lost from a steam turbine when the flow of steam required for moisturizing the air is removed from the turbine. The power lost from the steam turbine is then subtracted from the gross power output of the expander. The combustor/expander equipment will only be operating during load shedding periods. This is estimated at 8 hrs/day, 5 days/week, and 18 weeks/yr (or 8%/yr). The power value used in this analysis is from an estimate of Super Peak power prices for California utilities in 2010-11.

TABLE 1

| Parameter | Units | Value |
|---|---|---|
| Excess MAC Air to Combustor (combustion air stream) | klb/hr | 337 |
| MAC Power for Excess Air | MW | 11.7 |
| Expander + Generator Efficiency | % | 85 |
| Expander Inlet Temperature | ° F. | 1500 |
| Saturated Steam Pressure | psig | 90 |
| Combustor Air Moisture Content | % | 0-30 |
| Fuel (Natural Gas) Cost | $/mmbtu | 5 |
| Generated Power Value | $/MWh | 271 |
| Make-up Water Cost | $/klb | 1.0 |
| Utilization | %/yr | 8.2 |

Figure 4:
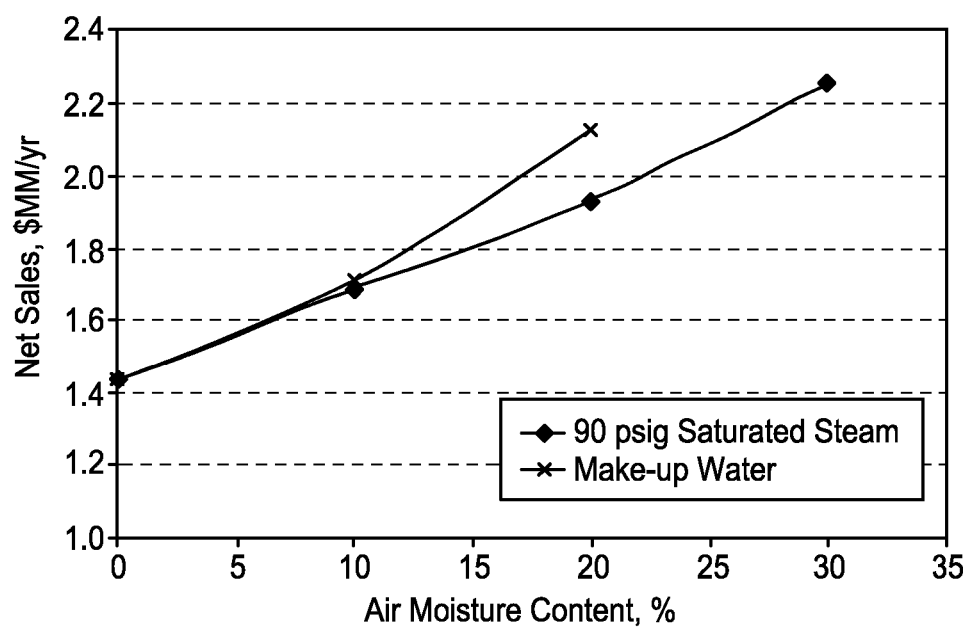
FIG. 4 is a graphical representation of an exemplary comparison between the embodiments shown in FIGS. 2 and 3.

The net sales (in $MM/yr) from operation of the integrations discussed above are summarized in FIG. 4 as a function of moisture added to combustion air stream 28. FIG. 4 shows that adding moisture via low pressure Steam (FIG. 2) or make-up water (FIG. 3) increases the profitability of the operation relative to the case where no moisture is added. There was not enough energy in the exhaust stream to increase the moisture content of the combustion air stream 28 to 30% using make-up water. However, when steam is used as the saturator water heating medium, the moisture content can be increased to 30%. The embodiment shown in FIG. 3 or in other words, the make-up water configuration is more profitable than steam configuration shown in FIG. 2 for the 20% moisture case because of the relative value of natural gas and power used. The make-up water case requires higher firing rates of fuel, but does not have any losses of power from a steam turbine. The make-up water configuration increases net power output while consuming additional fuel relative to the steam configuration.

As shown by the example, it is most economical to add moisture to the combustion air stream 28 by one of the two methods described above. However, other scenarios may exist where fuel consumption rate should be minimized at the expense of gross power production. Alternatively, make-up water and steam supply may be limited or prohibitively expensive. In those cases, it would be most economical to design the combustor/expander system without moisture addition to the air as shown in FIG. 1.

As mentioned above, there is not enough energy in the turbine expander exhaust gas in the example case to increase the moisture content in the air to 30% using make-up water. It is possible to combine the configurations described in FIG. 2 and FIG. 3 such that just enough steam is used in addition to the make-up water to increase the moisture content in the air to 30%. This increases the expander gross power output while minimizing the steam turbine power losses. The net sales from MAC integration operation are $2.5 MM/yr for this case (compared to $2.3 MM/yr for the 30% moisture case for steam alone).

Figure 5:
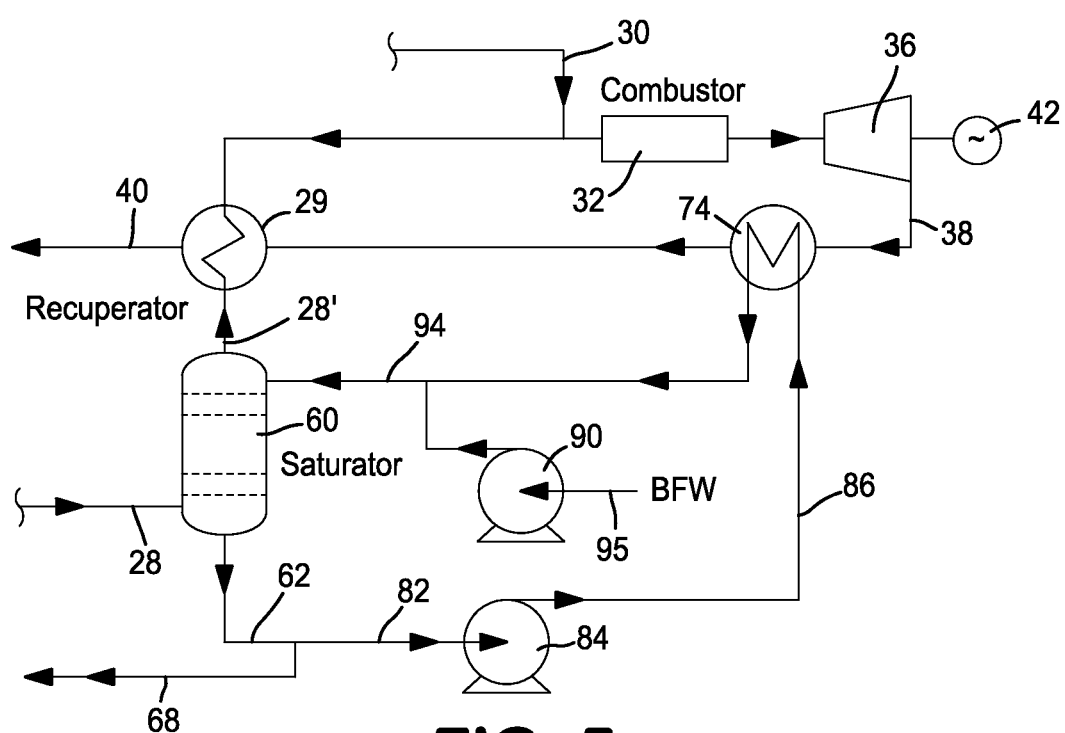
FIG. 5 is a fragmentary view of an alternative embodiment of FIG. 1.

Another modification to FIG. 1, downstream of valve 26, is illustrated in FIG. 5 which presents a further means for saturating the combustion air stream 28. This configuration is very similar to the one shown in FIG. 3 except that pre-heated boiling feed water "BFW" is used instead of make up water supplied by make-up water stream 70 as shown in FIG. 3. In this embodiment of the present invention, a water stream 82 is formed from bottoms water stream 62 less any discharge of the blowdown stream 68. A pump 84 pressurizes a water stream formed from bottoms liquid of the saturator to produce a pressurized water stream 86. A water heater 74 is connected to the pump 84 and positioned between the turbine 36 and the recuperator 29 to indirectly heat the pressurized water stream 86 with the hot exhaust stream 38. An outlet of the feed water pump 90 is positioned between the water heater 74 and the saturator 60 such that a heated and pressurized water stream 94 is formed by pumping a boiler feed water stream 95 within the pump 90 ("BFW") and combining the boiler feed water stream 95 after having been pumped with the pressurized water stream 86 after having been heated in the water heater 74. The saturator 60 in flow communication with the water heater 74 and configured to counter-currently contact the heated and pressurized water stream 94 with the combustion air stream 28 to saturate the combustion air steam 28 and thereby form the elevated level moisture containing combustion air stream 28'.

The profitability of this case is, however, similar to that shown in FIG. 3, but is slightly lower, as power is siphoned from the steam turbine to provide boiling feed water to moisturize the combustion air stream 28. The design shown in FIG. 3 may also be more feasible as makeup water is likely to be available from a nearby source whereas boiler feed water would have to be supplied directly from a boiler pre-heater; and there are not typically pre-heated boiler feed water supply headers.

Figure 6:
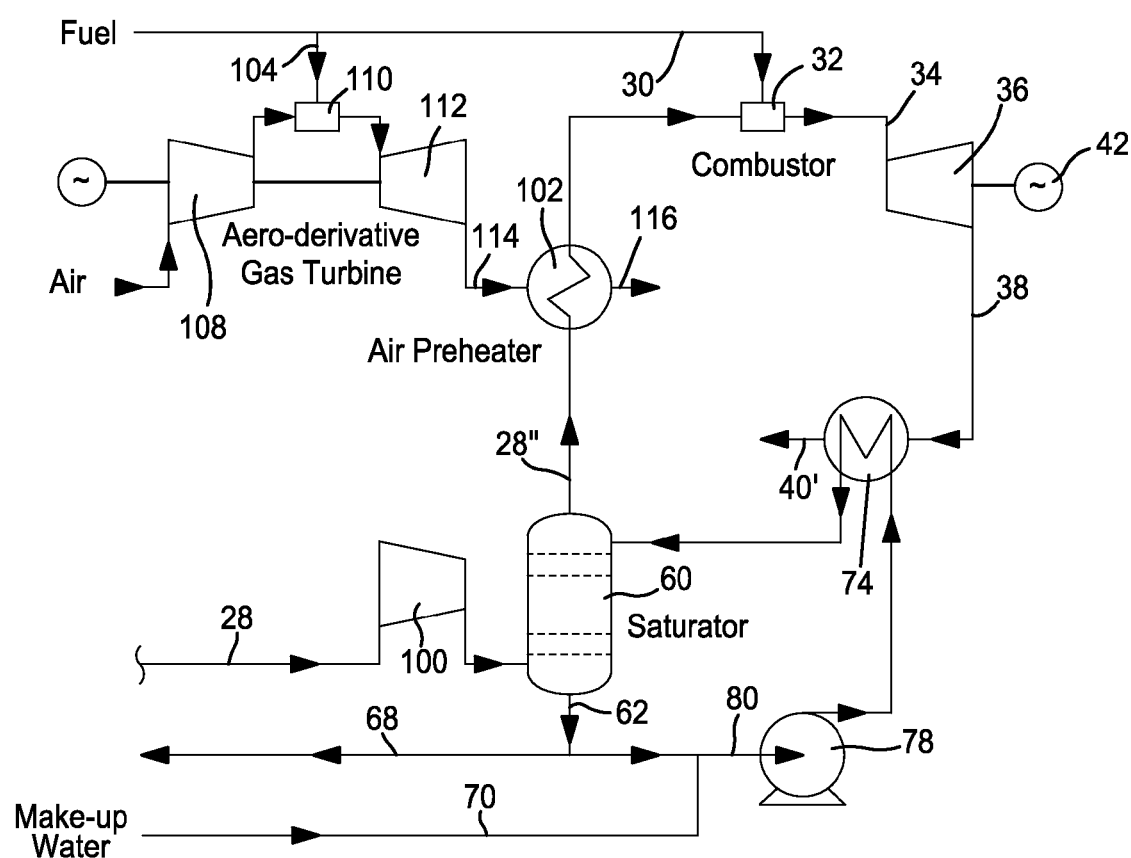
FIG. 6 is a fragmentary view of an alternative embodiment of FIG. 1.

If the profitability of integration with the previously-described embodiments is constrained by the relatively low spread between the cost of natural gas consumed and the value of the power saved during turn-down operating conditions of the air separation unit 18, then an alternative embodiment can be used in which an aero-derivative gas turbine is integrated that can increase net power production and process efficiency. Such an integration is shown in FIG. 6 which illustrates a modification to FIG. 1, downstream of valve 26. In such embodiment of the present invention, the combustion air stream 28 is compressed in a booster compressor 100 and is fed to the saturator 60 which in much the same manner as the apparatus shown and described with respect to the embodiment shown in FIG. 3 forms a moisture containing combustion air stream 28″ which is heated in an air preheater 102 and then introduced into combustor 32 along with a fuel stream 30. the resulting heated and pressurized combustion stream 34 is introduced into turbine expander 36 and the hot exhaust stream 38 passes through water heater 74 and is discharged directly as an exhaust 40′. As can be appreciated, other possibilities are to use steam and boiler feed water as supply sources for the moisture added to the air.

A fuel stream 104 is also burned in an aero-derivative gas turbine 106 genset to produce power. As illustrated, ambient air is compressed in a compressor 108 and the fuel stream 104 is combusted in a combustor 110 thereof. The heated combustion gases then flow to an expansion turbine 112 that discharges a turbine exhaust stream 114. The energy in a turbine exhaust stream 114 is recovered by preheating the moisture containing combustion air stream 28″ within the air preheater 102 and then discharge the same as an exhaust stream 116. The gas turbine 106 should be selected such that the flow of exhaust gas stream 116 exiting the expander 112 thereof is similar to the flow rate of moisture containing combustion air stream 28″ so that the gas turbine exhaust stack temperature is close to 300° F. This proposed configuration makes it possible to both preheat and add moisture to the air entering the combustor 32 which significantly increases the net power output, total efficiency, and profitability of a retrofit.

In this embodiment of the present invention it is to be noted, however, that the use of the air booster compressor 100 may not be required. Expander gross power output increases with increasing inlet pressure at constant inlet temperature. If an air booster is used in this or any of the alternative configurations, although not illustrated, taking the combustion air stream 28 after the pre-purifier would allow for additional incentive for including the air booster compressor 100. During periods when liquefaction capacity is needed the discharge of pre-purified air from the air booster compressor 102 could be sent through the main heat exchanger of the air separation unit 18 and expanded to provide additional refrigeration in the air separation unit.

An example of the integration shown in FIG. 6, was conducted using the economic parameters given in Table 1 below. The ambient temperature was 55° F., the combustion air stream 28 flow was 5794 mcfh-ntp (thousand normal cubic feet per hour at 70° F. and 1 atm) and the discharge pressure of the main air compressor 10 was 104 psia. The required motor power was 14.4 MW. The method for calculating the efficiency assumed that the heat losses from the combustor were 1% of the fired duty. When it was used, the adiabatic efficiency of the booster compressor was set to 83%. A General Electric Model LM2000 aero-derivate gas turbine was used since the turbine exhaust flow was close to the discharge air flow rate of the combustion air stream 28.

TABLE 1

| Parameter | Value |
| --- | --- |
| NG Cost (HHV basis) | $5/mmbtu |
| Power Value | $65/MWh |
| Make-up Water Cost | $1/klb |
| Utilization Rate | 95% |

The profitability of the excess air expander ("EAE") alone (as shown in FIG. 1) and EAE+aero derivative gas turbine ("Auxiliary Turbine" as shown in FIG. 6) retrofits were determined as a function of several variables: the extent to which moisture was added to the excess air; the use of an air booster and its designed compression ratio; and turbine expander inlet temperature. The design conditions and operating results for the best cases for the EAE Alone and EAE+Auxiliary Turbine concepts are summarized in Table 2.

TABLE 2

| Scenario | | EAE Alone | EAE + Aux. Turbine |
| --- | --- | --- | --- |
| Expander Inlet Temperature | ° F. | 1750 | 1750 |
| Booster Compression Ratio | — | n/a | 2.0 |
| Moisture in EAE Air | vol % | 0% | 23% |
| EAE Fuel Rate | mmbtu/hr | 109 | 198 |
| Auxiliary Turbine Fuel | mmbtu/hr | n/a | 185 |
| Expander Power | MW | 26 | 43 |
| Auxiliary Turbine Power | MW | n/a | 17 |
| Net Power Out | MW | 11 | 41 |
| Net Heat Rate, LHV | btu/kWh | 8720 | 8470 |
| Net Efficiency, LHV | % | 39.2% | 40.3% |
| Income from Operations | $MM/yr | 1.6 | 5.5 |

The results show that the EAE+Auxiliary Turbine design generates much more operating income than the EAE concept alone. The best case for EAE alone produced about $1.6 MM/yr in revenue while the best case for combining the EAE and auxiliary turbine can produce in excess of $5 MM/yr. The revenue increases as a result of higher net power production and process efficiency in the combined design.

Figure 7:
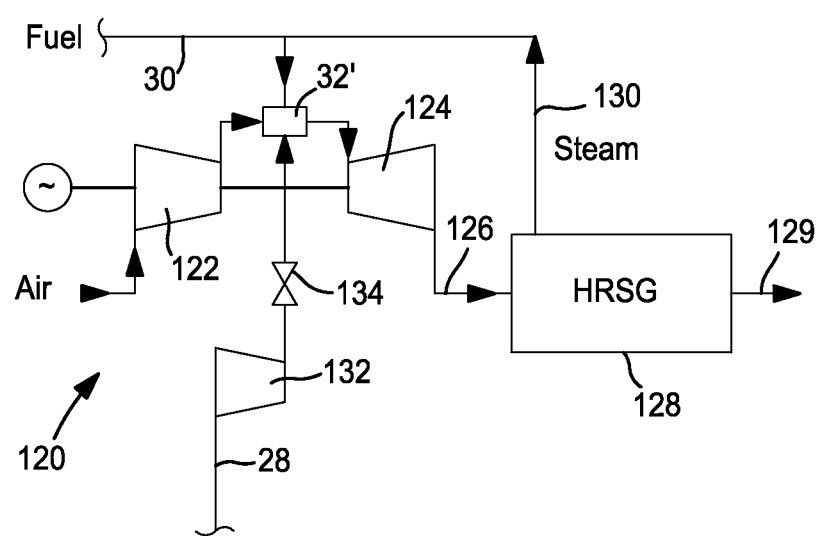
FIG. 7 is a fragmentary view of an alternative embodiment of FIG. 1.

With reference to FIG. 7 an alternative embodiment of FIG. 1 is illustrated, again downstream of valve 26, in which the combustor is a combustor of a gas turbine. In such embodiment, a fuel stream 30 is burned in an aero-derivative or an industrial (heavy duty) gas turbine 120 genset to produce power. As illustrated, ambient air is compressed in a compressor 122 and the fuel stream 30 is combusted in a combustor 32′ of the gas turbine 120. The heated combustion gases then flow to an expansion turbine 124 that discharges a turbine exhaust stream 126. The turbine exhaust stream 126 is then preferably introduced into a heat recovery steam generator 128 to generate a steam stream 130 that can be introduced into the combustor 32′ along with the fuel stream 30. Heat recovery steam generator 128 is well known in the art and functions to heat water to stream. After the heat transfer, a flue gas stream 129 composed of the turbine exhaust stream 126 is discharged. It is possible, however, to utilize the steam in a steam turbine. Having said this, it is to be noted that the use of the heat recovery steam generator 128 and the further utilization of the steam, either within combustor 32′ or elsewhere is optimal. The combustion air stream 28 is compressed by a compressor 132 and is also introduced into combustor 32′. A valve 134 can be selectively set is an open position during the turn down operational condition of the air separation unit 18 to allow additional power to be generated by virtue of the additional air flow into combustor 32. During the design condition of the air separation unit 18, the valve 134 is set in a closed position and the air flow to the combustor is generated solely by the compressor 122.

While the present invention has been described with reference to preferred embodiments, as will occur to those skilled in the art, numerous additions and changes thereto can be made without departing from the spirit and scope of the present invention as set forth in the appended claims.

We claim:

1. A method of separating air and generating electrical power comprising:
   compressing the air in a main air compressor to produce a compressed air stream;
   forming a combustion air stream from at least part of the compressed air stream;
   during design operational conditions, introducing the compressed air stream into an air separation unit and separating the air through cryogenic rectification to produce one or more products;
   during turn-down operational conditions where the one or more products are not being produced or being produced at a lesser rate, introducing the combustion air stream and a fuel stream into a combustor, combusting the fuel to produce a heated and pressurized combustion stream and expanding the heated and pressurized combustion stream in a turbine connected to an electrical generator to generate electrical power;
   operating the main air compressor such that the compressor produces the compressed air stream to allow the combustion air stream to be available during the turn-down operational conditions to support combustion of the fuel stream for generation of the electrical power;
   wherein the turbine produces an exhaust stream and the exhaust stream indirectly transfers heat to the combustion air stream prior to the introducing the combustion air stream into the combustor;
   the combustion air stream is saturated with moisture prior to the exhaust stream indirectly transferring heat to the combustion air stream
   wherein the combustion air stream is saturated with moisture by:
   condensing a steam stream in a condenser to produce a condensed stream;
   pumping the condensed stream in a pump to produce a first pressurized water stream;
   combining the first pressurized water stream with a second pressurized water stream to produce a combined water stream;
   heating the combined water stream in the condenser through indirect heat exchange with the steam stream to produce a heated water stream;
   counter-currently contacting the heated water stream with the combustion air stream in a saturator to produce the combustion air stream saturated with the moisture and a bottoms liquid; and
   recirculating at least part of the bottoms liquid to form the second pressurized water stream.

2. The method of claim 1, wherein the combustion air stream is saturated with moisture by:
   pumping a water stream in a pump to produce a pressurized water stream;
   heating the pressurized water stream with the exhaust stream in a water heater positioned between the turbine and a recuperator used in the indirect heat transfer from the exhaust stream to the combustion air stream to at least in part produce a heated water stream;
   counter-currently contacting the heated water stream with the combustion air stream in a saturator to produce the combustion air stream saturated with the moisture and a bottoms liquid; and
   forming the water stream by combining the bottoms liquid with a make-up water stream.

3. The method of claim 1, wherein the combustion air stream is saturated with moisture by:
   pumping a water stream composed of bottoms liquid of a saturator in a pump to produce a pressurized water stream;
   heating the pressurized water stream with the exhaust stream in a water heater positioned between the turbine and a recuperator used in the indirect heat transfer from the exhaust stream to the combustion air stream;
   pumping a boiler feed water stream and combining the boiler feed water stream with the pressurized water stream after having been heated in the water heater to form a heated water stream; and
   counter-currently contacting the heated water stream with the combustion air stream in the saturator to produce the combustion air stream saturated with the moisture and the bottoms liquid.

4. The method of claim 1, wherein:
   the combustion air stream is saturated with moisture by:
   pumping a water stream in a pump to produce a pressurized water stream;
   heating the pressurized water stream with the exhaust stream in a water heater to produce a heated water stream;
   forming the combustion air stream by further compressing the at least part of the compressed air stream in a booster compressor;
   counter-currently contacting the heated water stream with the combustion air stream in a saturator to produce the combustion air stream saturated with the moisture and a bottoms liquid; and
   forming the water stream at least in part from the bottoms liquid; and
   heating the combustion air stream after having been saturated by moisture through indirect heat exchange with a gas turbine exhaust used to generate additional electrical power.

5. The method of claim 1, wherein:
   the combustor is a combustor of a gas turbine and the expander is an expander of the gas turbine; and
   the combustion air stream is further compressed and introduced into the combustor.

6. An apparatus for separating air and generating electrical power comprising:
   a main air compressor to compress air and thereby to produce a compressed air stream;
   an air separation unit in flow communication with the main air compressor;
   the air separation unit configured to selectively operate in a design operational condition and a turn-down operational condition such that during the design operational condition the air within the compressed air stream is separated through cryogenic rectification to produce one or more products and during the turn-down operational condition, the one or more products are not being produced or being produced at a lesser rate than during design operational conditions;
   means for producing a combustion air stream from at least part of the compressed air stream;

a combustor in flow communication with combustion air stream producing means such that during the turn-down operation condition, a fuel stream is combusted in the combustor through combustion supported by the combustion air stream and a heated and pressurized combustion stream is produced from the combustion;

a turbine in flow communication with the combustor to expand the heated and pressurized combustion stream to produce an exhaust stream;

an electrical generator connected to the turbine to generate the electrical power;

the main air compressor having sufficient capacity to allow the combustion air stream to be available during the turn-down operational condition to support combustion of the fuel stream for generation of the electrical power;

wherein a recuperator is positioned between the turbine and the main air compressor such that an exhaust stream produced by turbine indirectly transfers heat to the combustion air stream prior to introduction of the combustion air stream into the combustor;

a means for adding moisture to the combustion air stream is positioned between the recuperator and the main air compressor such that the combustion air stream contains moisture prior to the exhaust stream indirectly transferring heat to the combustion air stream;

wherein the means for adding moisture comprises:

a condenser for condensing a steam stream in a condenser to produce a condensed stream;

a pump connected to the condenser to pump the condensed stream and thereby to produce a first pressurized water stream;

a saturator configured to counter-currently contacting a heated water stream with the combustion air stream to produce the combustion air stream with moisture and a bottoms liquid; and a recirculation flow path connected to the pump, the condenser and the saturator and configured to combine the first pressurized water stream with a second pressurized water stream to produce a combined water stream, to heat the combined water stream in the condenser through indirect heat exchange with the steam stream to produce the heated water stream and having a recirculation pump positioned to recirculate at least part of the bottoms liquid to form the second pressurized water stream.

7. The apparatus of claim 6, wherein the means for adding moisture comprises:

a pump to pressurize a water stream and thereby to produce a pressurized water stream;

a water heater connected to the pump and positioned between the turbine and the recuperator to indirectly heat the pressurized water stream with the exhaust stream to at least in part produce a heated water stream;

a saturator in flow communication with the water heater and configured to counter-currently contact the heated water stream with the combustion air stream to produce the combustion air stream with moisture and a bottoms liquid; and the pump in flow communication with the saturator and a make-up water inlet for introduction of a make-up water stream such that the water stream is formed from the bottoms liquid and the make-up water stream.

8. The apparatus of claim 7, wherein the means for adding moisture comprises:

a pump to pressurize a water stream formed from bottoms liquid of a saturator and thereby to produce a pressurized water stream;

a water heater connected to the pump and positioned between the turbine and the recuperator to indirectly heat the pressurized water stream with the exhaust stream to at least in part produce a heated water stream;

a feed water pump is positioned between the water heater and the saturator such that a heated water stream is formed by pumping a boiler feed water stream and the boiler feed water stream after having been pumped is combined with the pressurized water stream after having been heated in the water heater; and the saturator in flow communication with the water heater and configured to counter-currently contact the heated water stream with the combustion air stream to produce the combustion air stream with moisture and the bottoms liquid.

9. The apparatus of claim 6, wherein:

a pump pumps a water stream to produce a pressurized water stream;

a water heater is positioned between the pump and the turbine to heat the pressurized water stream with an exhaust stream produced by the turbine, thereby to produce a heated water stream;

the combustion air stream producing means comprises a booster compressor in flow communication with the main air compressor such that the at least part of the compressed air stream is further compressed to produce the combustion air stream;

a saturator is connected between the water heater and the booster compressor and configured to counter-currently contact the heated water stream with the combustion air stream, thereby to produce the combustion air stream with moisture and a bottoms liquid;

the pump is in flow communication with the saturator such that the water stream is formed at least in part from the bottoms liquid;

an air preheater is positioned between the combustor and the saturator such that the combustion air stream after having moisture added is preheated in the air preheater before being introduced into the combustor;

a gas turbine connected to another generator to generate additional electrical power and producing a gas turbine exhaust; and the gas turbine connected to the air preheater such that the combustion air stream is preheated in the air preheater through indirect heat exchange with the gas turbine exhaust.

10. The apparatus of claim 6, wherein:

the combustor is a combustor of a gas turbine and the expander is an expander of the gas turbine; and the combustion air stream producing means comprises a booster compressor in flow communication with the main air compressor such that the at least part of the compressed air stream is further compressed to produce the combustion air stream.

* * * * *